United States Patent [19]

Jackson

[11] 4,263,978

[45] Apr. 28, 1981

[54] CLOSURE TILT ASSIST MECHANISM

[75] Inventor: Mark H. Jackson, Dearborn Heights, Mich.

[73] Assignee: Ford Motor Company, Dearborn, Mich.

[21] Appl. No.: 966,976

[22] Filed: Dec. 6, 1978

[51] Int. Cl.[3] ........................ B62D 25/12; E05F 1/14; E05F 5/14

[52] U.S. Cl. ....................................... 180/69 C; 16/80; 16/85

[58] Field of Search ................... 16/65, 72, 75, 80, 85; 80/69 R, 69 C, 89.14, 89.15, 89.17, 89.18

[56] References Cited

U.S. PATENT DOCUMENTS

| | | | |
|---|---|---|---|
| 2,149,074 | 2/1939 | Runkle | 16/85 |
| 2,162,135 | 6/1939 | Tell | 16/65 UX |
| 2,520,921 | 9/1950 | Foster | 180/69 R X |
| 2,698,957 | 1/1955 | Vigmostad | 16/128.1 |
| 2,947,376 | 8/1960 | Norrie | 180/89.15 |
| 3,358,320 | 12/1967 | Shaw et al. | 16/128.1 |
| 3,388,417 | 6/1968 | Upchurch | 16/128.1 |
| 3,642,316 | 2/1972 | Porth et al. | 180/89.15 X |
| 3,711,892 | 1/1973 | Tabor | 16/76 |
| 3,737,192 | 6/1973 | Hirsch | 180/89.14 X |
| 3,747,271 | 7/1973 | Adamski | 49/340 |
| 3,950,819 | 4/1976 | Little | 16/85 X |

FOREIGN PATENT DOCUMENTS

| | | | |
|---|---|---|---|
| 475500 | 7/1951 | Canada | 180/69 C |
| 581078 | 9/1946 | United Kingdom | 16/65 |

*Primary Examiner*—Wm. Carter Reynolds
*Attorney, Agent, or Firm*—John J. Roethel; Clifford L. Sadler

[57] ABSTRACT

A compartment closure tilt assist mechanism that, independently of the operation of any counterbalance means in the compartment hinges, is effective to reduce the opening or lift effort for raising the closure to provide access to the compartment therebeneath. The assist mechanism comprises a lift arm 17 supported on a support strut 13 extending longitudinally of the compartment. Interposed between the lift arm and support strut are lift arm support links that are swingable about a pivot axis located below the strut. The links extend from the pivot axis angularly upwardly above the strut and support the lift arm between the closure and the strut in closed position of the closure. Over-center biasing means 33, coupled to the support strut and to the lift arm, are operative to reduce the lift effort to raise the compartment closure.

7 Claims, 3 Drawing Figures

FIG. 1.
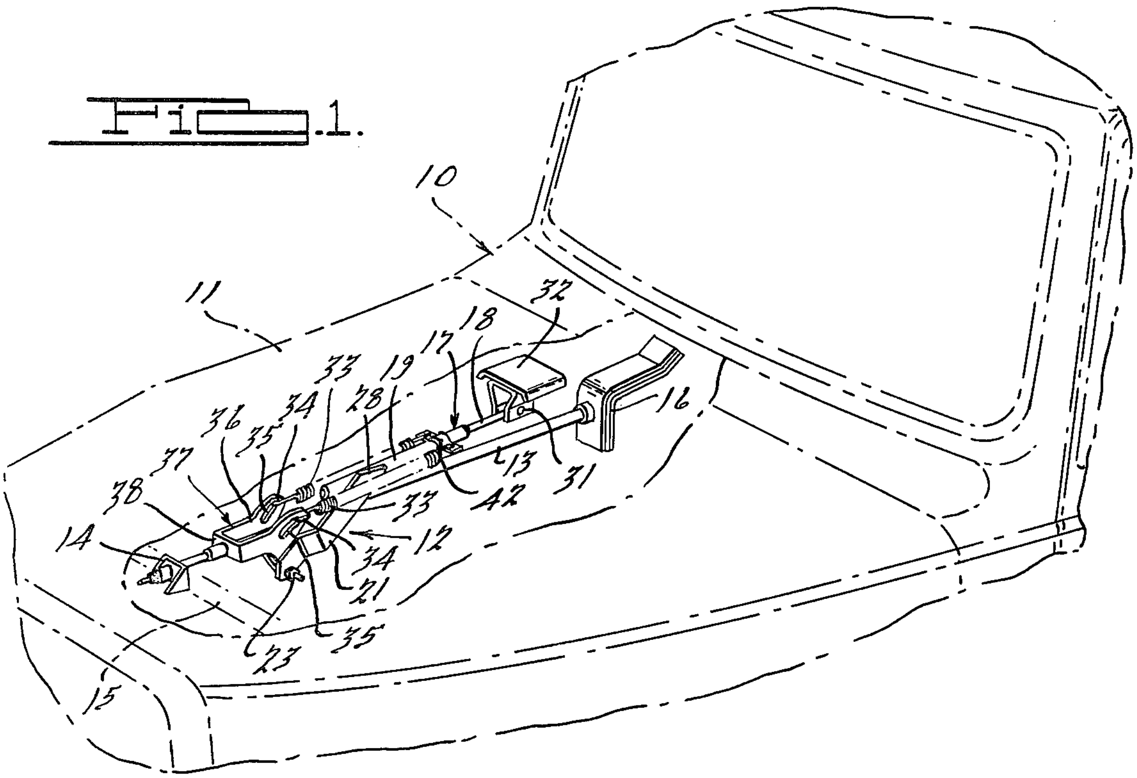
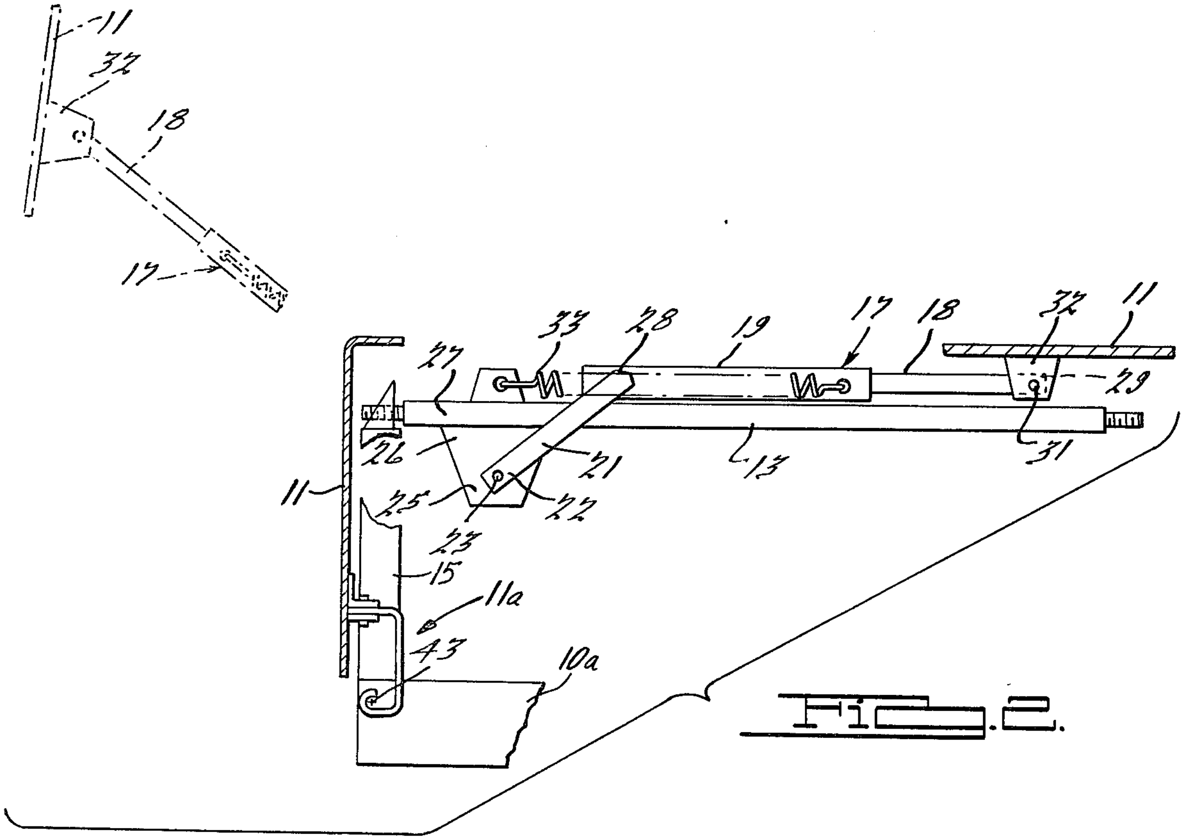
FIG. 2.

CLOSURE TILT ASSIST MECHANISM

BACKGROUND OF THE INVENTION

This invention is in the field of closure tilt assist mechanisms, and more particularly relates to a lift system that, independently of the hinges mounting the closure, such as a vehicle hood on a vehicle structure, is effective to reduce the opening effort without creating fore-and-aft loads which would induce closure instability and degrade the closure fit in the body opening receiving the closure.

An investigation of the prior art developed the following patents: U.S. Pat. No. 2,698,957 issued Jan. 11, 1955 to T. Vigmostad for a "Hinge Device"; U.S. Pat. No. 2,947,376 issued Aug. 2, 1960 to R. C. Norrie for an "Automotive Vehicle With Tilting Over-Engine Cab"; U.S. Pat. No. 3,358,320 issued Dec. 19, 1967 to L. R. Shaw et al for a "Hinge for Closure Elements"; U.S. Pat. No. 3,388,417 issued June 18, 1968 to J. D. Upchurch for a "Closure Hinge"; U.S. Pat. No. 3,711,892 issued Jan. 23, 1973 to P. C. Tabor for a "Closure Counterbalance"; and U.S. Pat. No. 3,747,271 issued July 24, 1973 to R. Adamski for a "Hinge".

The patents to Shaw et al (U.S. Pat. No. 3,358,320) and Upchurch (U.S. Pat. No. 3,388,417) disclose versions of closure tilt assist mechanisms incorporated with the vehicle hinge spring. The patents to Vigmostad (U.S. Pat. No. 2,698,957) and Adamski (U.S. Pat. No. 3,747,271) disclose other versions of hood tilt assist mechanisms. The patent to Tabor (U.S. Pat. No. 3,711,892) discloses a closure counterbalance for a vehicle hood having a spring biased telescoping strut. None of the prior art patents of interest, however, disclose a closure tilt assist mechanism as embodied in the present invention.

SUMMARY OF THE INVENTION

The present invention relates to a compartment closure tilt assist mechanism for a vehicle compartment closure structure pivotally hinged at one end for opening and closing swinging movement above a vehicle compartment. The closure tilt assist mechanism comprises a substantially horizontal support strut extending longitudinally of the vehicle within the compartment. The mechanism includes a telescopic lift arm supported on a link means that is pivotally carried on a support member fixed to the support strut. The link means is pivotal about a pivot axis located below the support strut near one end of the latter and extends angularly upwardly from the pivot axis and terminates above the support strut. The lift arm is fixedly mounted on the upper ends of the link means and extends toward the other end of the support strut in closed position of the closure. The lift arm is attached to the closure structure in proximity to the rear edge of the latter. An over-center assist biasing means is pivotally coupled at one end to the support strut and at its other end to the lift arm. The assist biasing means is effective to reduce the effort in raising the closure structure.

More particularly, the assist biasing means comprises a pair of tension springs each having a hook portion. A bracket means mounted on the support strut has upstanding flanges straddling the support strut. These flanges each have longitudinally extending arcuate slots therein engaged by a hook portion of each spring. The slots permit the hook portion to move fore-and-aft in the slots as the tension springs pivot thereabout to maintain the springs substantially in alignment with the lift arm whereby fore-and-aft spring loads are carried as compression loads in the lift arm member.

DESCRIPTION OF THE DRAWINGS

Other features and advantages of this invention will be made more apparent as this description proceeds, particularly when considered in connection with the accompanying drawings, wherein:

FIG. 1 is a perspective view of a motor vehicle front end incorporating the present invention, the hood portion being cut away to show the tilt assist mechanism incorporating the present invention;

FIG. 3 is a diagrammatic view of the tilt assist mechanism components.

DETAILED DESCRIPTION OF THE INVENTION

Figure 2:
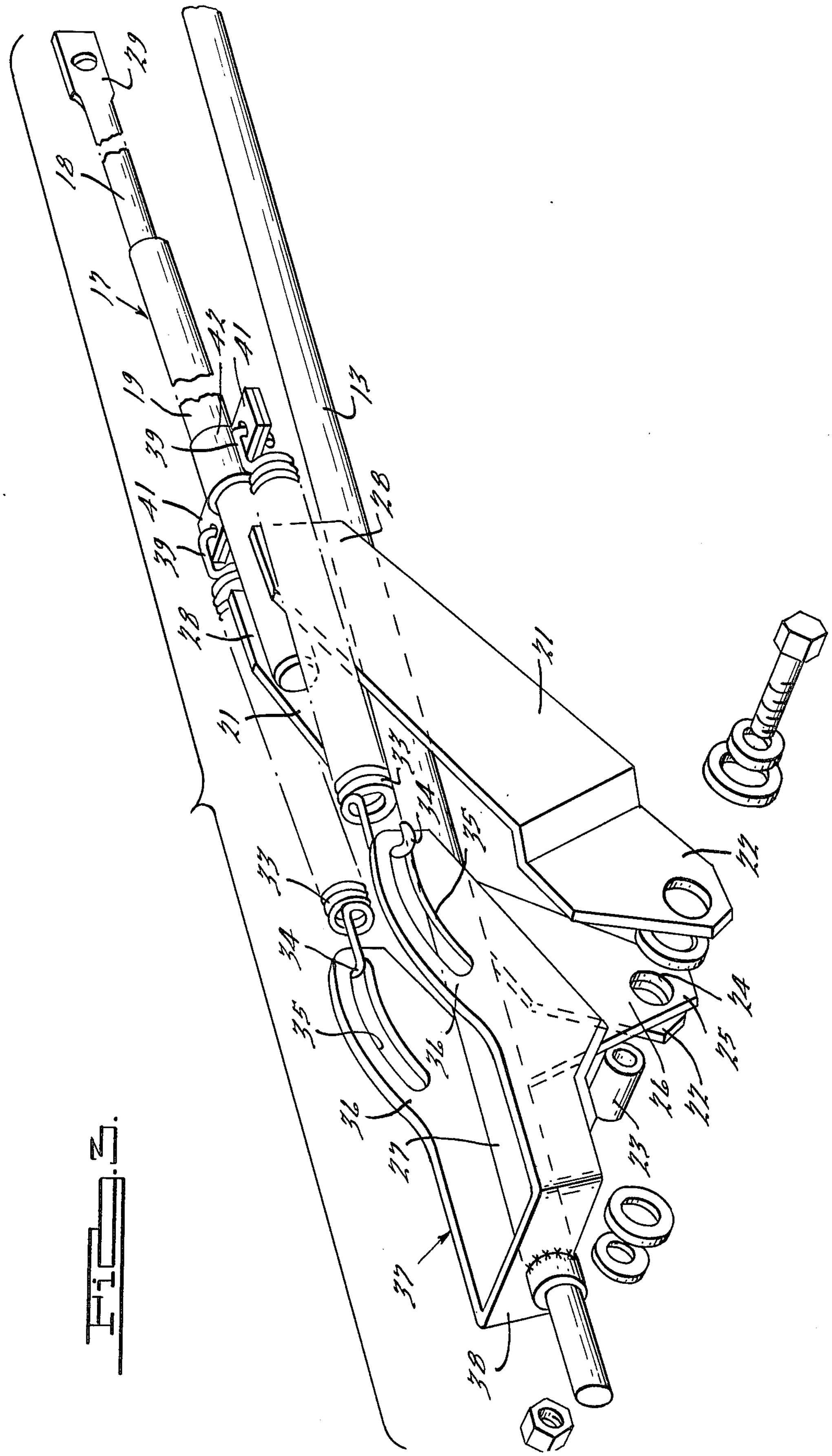
FIG. 2 is an enlarged view of the tilt assist mechanism.

Referring to FIG. 1, there is shown in dot-dash outline the general outline of the front end of a vehicle, generally designated 10. The vehicle has a hinged hood 11 with the hood being hinged on a pair of laterally spaced hinge devices 11*a* mounted at the forward extremity of the vehicle frame 10*a* at its front end and latched to the vehicle cowl at its rear end. The hinges 11*a* and latch devices are conventional and form no part of the present invention. To gain access to the engine compartment beneath the hood 11 for engine repairs or the like, it is necessary to tilt the hood about its frontal hinge axis to a substantially upstanding position. On a small vehicle such as a light truck or a passenger car, the lift weight of the hood 11 usually can be counterbalanced by counterbalance springs that are a part of the hinge devices. On a heavy duty vehicle or truck, the lift weight of the hood may be too great for conventional counterbalancing methods. To assist in the opening movement of a heavy hood 11, a hood tilt assist mechanism, generally designated 12, as illustrated in FIG. 1, may be provided.

The hood tilt assist mechanism 12 is disposed beneath the hood 11 substantially on the longitudinal center line of the vehicle. It comprises a substantially horizontal radiator support strut 13 that extends from a bracket 14 mounted on the top of the radiator 15, the latter being supported on the vehicle frame members 10*a* above the hood hinges 11*a*, to a second bracket 16 mounted on the vehicle cowl. Supported above the strut 13 is a telescopic lift arm 17 having a movable or extensible member 18 protractable or extendible from an immovable or nonextensible tubular member 19.

The telescopic lift arm 17 is mounted on a pair of spaced links 21 that straddle the support strut 13. The links 21 are pivotally supported at their lower ends 22 on a pivot bushing 23 journalled in an aperture 24 at the lower end 25 of a support member 26 welded to and projecting downwardly from the support strut 13 at the end 27 of the latter nearest the radiator 15. Suitable bolt, washer and nut devices are used to maintain the links 21 in assembled relation to the pivot 23. The links 21 thus are pivotal about a pivot axis located below the support strut 13. The links 21 extend angularly upwardly from this pivot axis beyond the support strut 13 where they terminate. The upper ends 28 of the links are welded to the tubular member 19 of the lift arm 17.

In closed position of the hood 11, as shown in the drawings, the lift arm 17 extends toward the vehicle cowl between the hood and the support strut 13. The end 29 of lift arm movable or extensible member 18 is coupled by a pivot pin 31 to a bracket 32 depending from the hood 11 near the cowl end of the latter.

The hood tilt assist mechanism 12 is provided with a pair of over-center assist biasing means in the form of tension springs 33. The tension springs 33 are located on each side of the telescopic lift arm 17. Each spring 33 has a hook portion 34 at one end that is hooked into an arcuate slot 35 in the legs 36 of a U-shaped bracket 37. The legs 36 of the bracket are substantially parallel to the longitudinal axis of the support strut 13 and the slots 35 in each leg extend in a substantially longitudinal direction. The base 38 of the U-shaped bracket is apertured to fit over the support strut and the two are welded together. Each spring 33 has a second hook portion 39 at its opposite end that hooks into apertured wings 41 on a clamp device 42 encircling the tubular member 19 of the telescopic lift arm.

With particular reference to FIG. 2, as the hood 11 is swung upwardly about its frontal hinges 11*a* about the hinge axis represented by the point 43, the lift arm 17 swings on its support links 21 about the pivot axis 23. The effective length of the lift arm 17 is equal to the distance between the pivot axis 23 of the links 21 and the pivot axis 31 at which the end 29 of the lift arm movable or extensible member 18 is coupled to the bracket 32 beneath the hood 11. It will be noted here that the telescoping function of the lift arm 17 is required because the pivot axis 23 of the lift arm does not lie on the hood tilt or hinge axis 43. Therefore, as the hood swings from its horizontal position to its dot-and-dash outline tilted position, the length of the lift arm must contract and expand because of the eccentricity of its swinging movement relative to that of the hood 11.

The over-center assist springs extending the ends of the slots 35 in the bracket 37 to the clamp device 42 on the immovable or nonextensible member 19 of the lift arm are pre-loaded in tension so that the lift force is applied to the lift arm when the hood is raised slightly upon release of the latch devices at the cowl. As the hood is raised, the hook portion 34 of the springs 33 are permitted to move along the arcuate slots 35 thus maintaining the springs in substantial longitudinal alignment with the longitudinal axis of the lift arm 17. The fore-and-aft load on the lift arm thus is substantially a compression load at all times. At the neutral position in the swinging movement of the lift arm, i.e., the point at which the pivot axis 23, the pivot point at which the hook portion 34 of each spring 33 is engaged with a side wall of a slot 35 and is swinging thereabout, and the point of engagement of the hook portion 39 at the other end of each spring 33 is engaged with the aperture in a wing 41 of the clamp device 42 is in substantial alignment, no lifting or restoring force occurs. Movement behond this neutral line converts the lift force into a restoring force.

As the hood 11 is moved to a closed position after having been opened, the lift force in effect becomes a closing movement resistance force that substantially improves the closing operation of the hood by eliminating any crashing impact of the hood on the cowl and enables a firm but gentle closing contact to be made.

It is to be understood this invention is not limited to the exact construction illustrated and described above, but that various changes and modifications may be made without departing from the spirit and scope of the invention as defined by the following claims.

I claim:

1. A hood tilt assist mechanism for a vehicle hood structure pivotally hinged at one of its ends for opening and closing swinging movement above a vehicle engine compartment having a radiator structure at one end and cowl structure at the other end, the hood tilt assist mechanism comprising a substantially horizontal radiator support strut extending from the radiator structure to the cowl structure, a telescopic lift arm having an extensible member extending from a nonextensible member, support means pivotally mounted at one end on a support member depending from the support strut, the support means extending from its pivot axis angularly upwardly above the support strut, the lift arm nonextensible member being fixedly mounted on the end of the support means above the support strut and extending in a substantially horizontal direction in hood structure closed position, the extensible member of the lift arm being attached to the hood structure at the end of the latter opposite its hinged end, and over-center assist biasing means, pivot means pivotally coupling the assist biasing means at one end to the support strut and at the other end to the lift arm nonextensible member, the assist biasing means being operative to reduce the opening effort in raising the hood structure and to cushion the impact of the hood as it approaches the end of its movement in closing direction.

2. A hood tilt assist mechanism according to claim 1, in which:

the assist biasing means are swingable with the lift arm as the latter is raised or lowered, the assist biasing means exerting no lifting or restoring force when the pivot axis of the lift arm support means, the pivot axis of the pivot means pivotally coupling the assist biasing means to the support strut, and the pivot axis of the pivot means pivotally coupling the biasing means to the lift are nonextensible member are in alignment.

3. A hood tilt assist mechanism according to claims 1 or 2, in which:

the assist biasing means comprises a pair of tension springs each having a hook portion, a bracket means mounted on the support strut has upstanding flanges straddling the support strut, the flanges each have longitudinally extending arcuate slots therein engaged by the spring hook portion of a respective one of the springs, the slots permit the spring hook portions to move fore-and-aft in the slots as the tension springs pivot thereabout to maintain the spring substantially in alignment with the lift arm whereby the fore-and-aft spring loads are carried as compression loads in the lift arm nonextensible member.

4. A hood tilt assist mechanism for a vehicle hood structure pivotally hinged at its front end for opening and closing movement above a vehicle engine compartment having a radiator structure at its front end and a cowl structure at its rear end, the hood tilt assist mechanism comprising a longitudinally extending support strut extending from the radiator structure to the cowl structure, a telescopic lift arm having an extensible member protractable from a nonextensible member, link means pivotally mounted on a support member fixed to the support strut, the link means being pivotal about a pivot axis located below the support strut near the radiator structure end of the latter and extending angularly upwardly from the pivot axis and terminating above the support strut, the lift arm nonextensible member being mounted on the link means and extending toward the cowl structure above the support strut in closed position of the hood, the extensible member being attached to the hood structure in proximity to the rear edge of the latter, and over-center assist biasing means, pivot means pivotally coupling the assist biasing means at one end to the support strut and at the other end to the lift arm nonextensible member, the assist biasing means being effective to reduce the effort in raising the hood structure.

5. A hood tilt assist mechanism according to claim 4, in which:

the assist biasing means is swingable with the lift arm as the latter is raised or lowered, the assist biasing means exerting no lifting or restoring force when the pivot axis of the link means, the pivot axis of the pivot means pivotally coupling the assist biasing means to the support strut, and the pivot axis of the pivot means pivotally coupling the biasing means to the lift arm nonextensible member are in alignment.

6. A hood tilt assist mechanism according to claims 4 or 5, in which:

the assist biasing means comprises a pair of tension springs each having a hook portion, a bracket means mounted on the support strut has upstanding flanges straddling the support strut, the flanges each have a longitudinally extending arcuate slot therein engaged by the hook portion of one of the tension springs, and the slots permit the hook portions to move fore-and-aft in the respective slots as the tension springs pivot thereabout to maintain the springs substantially in alignment with the lift arm whereby the fore-and-aft spring loads are carried as compression loads in the nonextensible lift arm member.

7. A hood tilt assist mechanism according to claim 4, in which:

the assist biasing means comprises at least one tension assist spring longitudinally aligned with the lift arm and bodily swingable with the latter as it is raised and lowered, the spring exerting a lifting or restoring force when the pivot axis of the lift arm support links, the pivot axis of the pivot means pivotally coupling the spring to the support strut, and the pivot axis of the pivot means pivotally coupling the spring to the lift arm nonextensible member are nonaligned.

* * * * *